United States Patent [19]

Pei

[11] 4,248,297
[45] Feb. 3, 1981

[54] GLASS-CERAMIC ARTICLE AND METHOD OF MAKING SAME

[75] Inventor: Yu K. Pei, Toledo, Ohio

[73] Assignee: Owens-Illinois, Inc., Toledo, Ohio

[21] Appl. No.: 782,589

[22] Filed: Mar. 29, 1977

Related U.S. Application Data

[60] Division of Ser. No. 650,995, is a continuation of Ser. No. 146,665, May 25, 1971, abandoned, which is a continuation-in-part of Ser. No. 30,859, Apr. 22, 1970, abandoned.

[51] Int. Cl.³ .......................... F28F 3/00; F28F 7/02
[52] U.S. Cl. .................................... 165/166; 165/10; 65/4 A; 65/33
[58] Field of Search ...................... 165/10, 165, 166; 65/DIG. 7, 4, 33

[56] References Cited

U.S. PATENT DOCUMENTS

| | | | |
|---|---|---|---|
| 2,821,369 | 1/1958 | Hilliard | 165/164 X |
| 2,887,303 | 5/1959 | Reys | 165/165 X |
| 3,112,184 | 11/1963 | Hollenbach | 264/63 X |
| 3,269,817 | 8/1966 | Bondley | 65/4 |
| 3,279,931 | 10/1966 | Olcott | 165/10 X |

FOREIGN PATENT DOCUMENTS

614914  2/1961  Canada ..................... 165/10

Primary Examiner—Albert W. Davis
Attorney, Agent, or Firm—Charles S. Lynch; Myron E. Click; David H. Wilson

[57] ABSTRACT

Disclosed is an assembly or matrix comprising an arrangement of integrally fused tubes forming a series of nonporous, longitudinal parallel passageways therethrough. The matrix is of a low-expansion ceramic material and the passageways therethrough have thin walls; a high proportion of the cross-sectional or frontal area of the matrix is free open area. Also disclosed are methods for making such a matrix from glass tubes that are thermally crystallizable; one method involves longitudinally bundling the tubes with their ends sealed and heating the assembly to soften, expand and fuse the tubes in a heat treatment schedule that also nucleates and thermally crystallizes the matrix to the final ceramic product. Another embodiment involves superimposing a plurality of layers of tubes, one layer above the other in successive parallel planes, with the tubes in each plane being essentially parallel to each other and transverse to the tubes in adjacent layers. The matrix of tubes, each with its ends sealed, is heated to soften, expand and fuse the tubes. The sealed ends are opened and a plurality of such matrices are assembled into an annular structure, each matrix being separated from adjacent matrices by a wedge-shaped member.

5 Claims, 19 Drawing Figures

GLASS-CERAMIC ARTICLE AND METHOD OF MAKING SAME

This is a division, of application Ser. No. 650,995 filed Jan. 21, 1976 now abandoned which in turn is a continuation of Ser. No. 146,665 filed May 25, 1971 now abandoned, which in turn is a continuation-in-part of Ser. No. 30,859 filed Apr. 22, 1970 now abandoned.

This invention relates to an assembly or matrix of fused ceramic tubes ideally suited for a variety of uses and applications, and more particularly as a compact regenerative heat exchanger. More specifically, the matrix of this invention is useful in gas turbine engines designed for fuel economy when the engine is operating at less than full power. Another use for the article of this invention is as a burner screen in a Bunsen or Fisher burner. The invention also relates to a method for making such assembly.

Gas turbine engines offer potentially significant advantages over piston engines for automobile and truck use. Well designed gas turbine engines produce extremely low amounts of air pollutants because such engines operate at high temperatures and at high air-fuel ratios, thereby effecting essentially complete combustion. The use of only one spark plug and the use of non-leaded fuels further insure minimizing or eliminating lead. Gas turbine engines are lighter in weight and more compact than piston engines of comparable power. Also, reliability is greater and maintenance cost of gas turbines is less than with piston engines because the engine is simpler, having fewer moving parts.

However, the fuel efficiency of gas turbine engines at less than full design loads, as for example, in stop and go driving in automobiles and trucks, is not yet sufficiently high for them to be competitive with piston engines for automobile and truck use. Much effort has been directed toward increasing the efficiency of gas turbine engines, that is, to providing means for converting a larger proportion of the calorific content of the fuel into energy. Since most of the waste calories come out of the exhaust in the form of heat, the efficiency of the engine can be increased if this waste heat is returned to the work cycle. It has been proposed to accomplish this by rengerative heat exchangers, which in one form are foraminous discs of heat-retaining material that rotate in the engine exhaust gases and convey heat from the exhaust gases to the incoming air.

Requirements for a successful regenerator are so stringent that they have not been completely satisfied by currently available structures. Thermal properties necessary for the regenerator include (a) ability to withstand inlet temperatures at least as high as 1450° F. for extended periods of time;

(b) high thermal shock resistance so that the structure will withstand engine start-up when it is subjected to a sudden temperature elevation from ambient temperature to temperatures on the order of 1400°-1500° F., and will not be ruptured or distorted by the temperature gradient across the regenerator, which may be as high as 1400° F. at a cold start and 900° F. in a steady state operation;

(c) low coefficient of thermal expansion to minimize any distortion of the precisely dimensioned rotary wheel under the aforementioned thermal gradients;

(d) high heat capacity (product of specific heat and density); and (e) low thermal conductivity, to prevent the flow of heat through the material comprising the regenerator in a direction perpendicular to the flow of the hot gases, and, most importantly, to minimize the conduction of heat along the length of the tubes in order to obtain most efficient heat exchange with the flowing gases from cycle to cycle.

Regenerator structures must have high surface area to achieve good heat transfer. However, the friction generated by the gases passing through the structure must be low since energy expended in overcoming friction represents lost horsepower. To minimize pressure drop across the regenerator, the regenerator should have a multiplicity of parallel, smooth, and unobstructed passageways extending through it and should have a high percentage of open or free frontal area. The walls of such passageways should be nonporous to the gases flowing through the passageways. Such passageways preferably should not contain any two adjacent surfaces which meet at an acute angle since the passageway formed by such an acute angle causes high frictional losses which are detrimental to the operation of the regenerator.

In operation, the air and exhaust gas sections of a rotating regenerator are separated by a stationary seal bar which is in contact with and rubs against the face of rotating regenerator wheel. Since abrasion and mechanical shock can be caused by the seal bar, the regenerator surface should also have good wear resistance and a low coefficient of friction.

Some regenerators have been and are formed from metals. However, the high coefficient of thermal expansion of such metals and the resultant distortion under thermal gradients is a serious drawback to their use for this purpose. Also, and more importantly, since the thermal conductivity of metals is so great, the desirable high thermal gradient in the matrix material from the hot to the cold face is difficult to achieve. Thus, a maximum temperature difference along the lengths of the tubes is important from the standpoint of efficiency of heat transfer with the gases.

Other regenerators are formed by a lost paper process in which paper is coated with a ceramic slurry containing a thermosetting plastic binder, corrugated with hot rolls, shaped into a wheel configuration, and then burned out during fusion of the ceramic, leaving the ceramic sheel formed of sintered particles. However, preparation of regenerators by particle-sintering results in a porous structure. Porosity lowers the strength, decreases the heat capacity of the structure and increases friction loss. Also, in thin-walled regenerator structures, many of the pores extend from one wall through to the opposite wall, and provide an undesirable permeability of the gases through the walls.

Widespread use of gas turbine engines for automobiles and trucks is dependent upon development of a successful regenerator.

Accordingly, it is an object of this invention to provide a structure or matrix of superior properties, and especially a matrix capable of use as a gas turbine regenerator which does not have the aforementioned deficiencies of previous regenerators.

Another object of this invention is to provide a matrix having a low coefficient of linear expansion, low thermal conductivity, and which is capable of withstanding temperatures of the order of 1450° F. for long periods of time, and temperatures of 1800° F. to 1950° F. and higher for shorter periods.

Another object of the invention resides in such a ceramic matrix in the form of a honeycomb structure wherein the longitudinal passageways have in cross-section a substantially hexagonal configuration. This is a particularly strong configuration and, of course, adjacent heat exchange surfaces or walls meet at obtuse angles, thereby minimizing pressure drop during flow of gases through the passageways.

Still another object is to provide an assembly or matrix structure having a multiplicity of thin-walled parallel, smooth and unobstructed passageways, which structure has a high percentage of free frontal area and a high surface area, but which produces relatively little frictional loss of pressure when gases are passed therethrough.

Another object of the present invention is to provide a process for making the aforementioned structure or matrix.

A further object of this invention is to provide an assembly or matrix having a plurality of layers of tubes which are superimposed one above the other in successive parallel planes, the tubes within each plane being essentially parallel to each other and transverse to tubes in adjacent layers, each tube being integrally fused to each adjacent parallel tube and each adjacent transverse tube, which assembly or matrix is suitable for use in a cross-flow regenerator.

Still a further object of this invention is to provide a process for assembling a layer or ribbon consisting of a plurality of tubes disposed in parallel relationship, with each tube longitudinally adhering to each tube adjacent thereto, wherein said layer or ribbon of tubes is then utilized in quickly and economically assembling a matrix for use in a cross-flow recuperator.

Other objects, as well as aspects and advantages of the invention will become apparent from a study of this specification and the drawings.

According to one aspect of the invention there is provided an assembly or matrix comprising a bundle of integrally fused tubes forming a series of smooth, longitudinal, parallel passageways therethrough, wherein the walls defining said passageways:

(1) have essentially zero porosity, (2) consist essentially of an inorganic crystalline oxide ceramic material, (3) have an average coefficient of lineal thermal expansion of about $-12$ to $+12\times10^{-7}/°C$. over the range 0°-300° C. and preferably $-5$ to $+5\times10^{-7}/°C$. over such range, (4) have a maximum inner diameter of 0.1 inch, and (5) have a wall thickness of about 0.03 to 0.002 inch through portions of such walls common to adjacent tubes, the ratio of said inner diameter to said thickness being at least 3, and wherein the thermal conductivity of the ceramic material of said matrix is substantially less than metal and preferably less than 0.01 cal/cm$^2$/sec/cm/°C. at 400° C., and the open frontal or cross-sectional area is at least 60 percent of the cross-sectional area of the matrix. The surface density for such a matrix is at least 270 square feet per cubic foot of matrix. As used herein, surface density is defined as the total square feet of wall surface area per cubic foot of the assembly or matrix.

Since the matrix has an open frontal area of at least about 60 percent, the sum of the cross-sectional areas of the walls defining the passageways is at most 40 percent of the total frontal or cross-sectional area of the matrix structure.

For most applications matrices having the foregoing properties but having a ratio of the inner diameter of the tubes or passageways to wall thickness of at least 3.6 and having an open frontal or cross-sectional area of at least 65 percent of the matrix cross-sectional area are preferred, because in applications such as in a gas turbine regenerator, for instance, the increased open area minimizes pressure drop and also increases surface density, which latter property increases the heat transfer rate to and from the gases passing therethrough. The surface density for such preferred matrix structures is at least 295 square feet per cubic foot of matrix.

Moreover, for the embodiments of the matrix structure of the invention just described, i.e., wherein the open frontal area is at least 60 percent, usually 65 percent, the usually preferred inner diameter of the passageways or tubes is no more than 0.05 inch because the smaller tubes or passageways greatly increase the surface density. Thus, the surface density is at least 540 square feet per cubic foot of matrix when the open frontal area is at least 60 percent, and the surface density is at least 590 square feet per cubic foot of matrix when the open frontal area is at least 65 percent of the matrix.

Various types of regenerator matrices have been made in the past from metal. One important advantage of the present matrices is that the very low thermal conductivity of the essentially crystalline inorganic oxide ceramic material, as compared to metal, results in a much higher temperature gradient from inlet to outlet ends of the passageways of the matrix, when used as a regenerative heat exchanger. This is very important, since the hot combustion gases flow through the matrix passageways in one direction, and the incoming air flows through in the opposite direction. The cold air thus contacts the cooler end of the matrix first and the hotter end last. The greater the temperature difference from the inlet to outlet sides of the matrix the greater the driving force for transfer of heat from the matrix to the air or combustion gases; and thus the greater the efficiency of heat recovery.

It should be noted that in the first matrix structure described hereinbefore the ratio of the inner diameter to the thickness of the portions of walls common to adjacent passageways is 3, and that the thickness of the portions of the walls common to the adjacent passageways is from 0.03 to 0.002 inch. When reading the description hereinafter of a corresponding process suitable for making the new matrix structures, it will be noted that the starting material tube wall thickness is about 0.015 to about 0.001 inch for the individual starting material tubes, and that the ratio of the inner diameter of such tubes to such wall thickness is at least 6. It will be appreciated that when portions of walls of two tubes fuse together, they become one common wall of approximately twice the thickness, or somewhat less than twice the thickness when measurable expansion of the tubes is effected during the fusion process.

As used in the structure claims of this invention, the term inner diameter refers to the shortest distance through the center of the tube or passageway from one inner wall to the opposite inner wall. This distance is the same for all diameters of a circle, of course, but for a hexagon, for instance, the "diameter" defined in the claims is the distance of a line through the center of the hexagon and perpendicular to opposite side walls of the hexagon.

Figure 6:
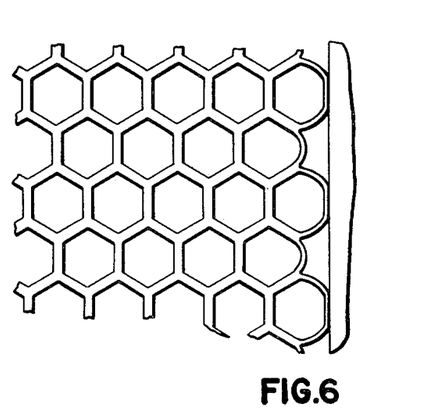
FIG. 6 is a top plan view of a small portion of the structure of the invention, greatly enlarged, showing the arrangement of the glass tubes after they have been expanded and crystallized by heat treatment.

Another feature of the invention resides in a ceramic honeycomb structure comprising an aggregation of integrally fused tubes having longitudinal passageways which in cross-section have substantially hexagonal configuration, which configuration results in adjacent heat exchange surfaces meeting at obtuse angles. See FIG. 6.

According to one embodiment of the invention, a novel method is provided which is suitable for preparing the desired foraminous ceramic structures of the invention. Such method comprises assembling a plurality of thin, elongated, hollow, thermally crystallizable glass tubes in closely packed, parallel relationship, each of the tubes having a fluid medium sealed therein, and subsequently heat-treating the assembly of tubes and thereby causing (1) the tubes to soften, (2) the fluid medium to expand the tubes outwardly so that adjoining contacting surfaces of the tubes fuse together to form a unitary structure and (3) the tubes to thermally in situ crystallize to form an at least partially crystalline inorganic oxide ceramic material commonly referred to in the art as a glass-ceramic. The expansion of the tubes by the fluid expansible medium sealed therein is important from two aspects. First, even if the actual expansion or reshaping of the tubes by the pressure of the hot expansible medium or gas is small, the pressure exerted forces adjacent surfaces into contact and is important to obtaining proper fusion of the tubes. Secondly, where desired the expansion can be effected to expand and reshape circular tubes, for instance, into a desirable hexagonal shape.

Other features of the invention will become apparent to those skilled in the art from a consideration of the following detailed description taken together with the drawings, wherein.

Figures 1, 2, 3:
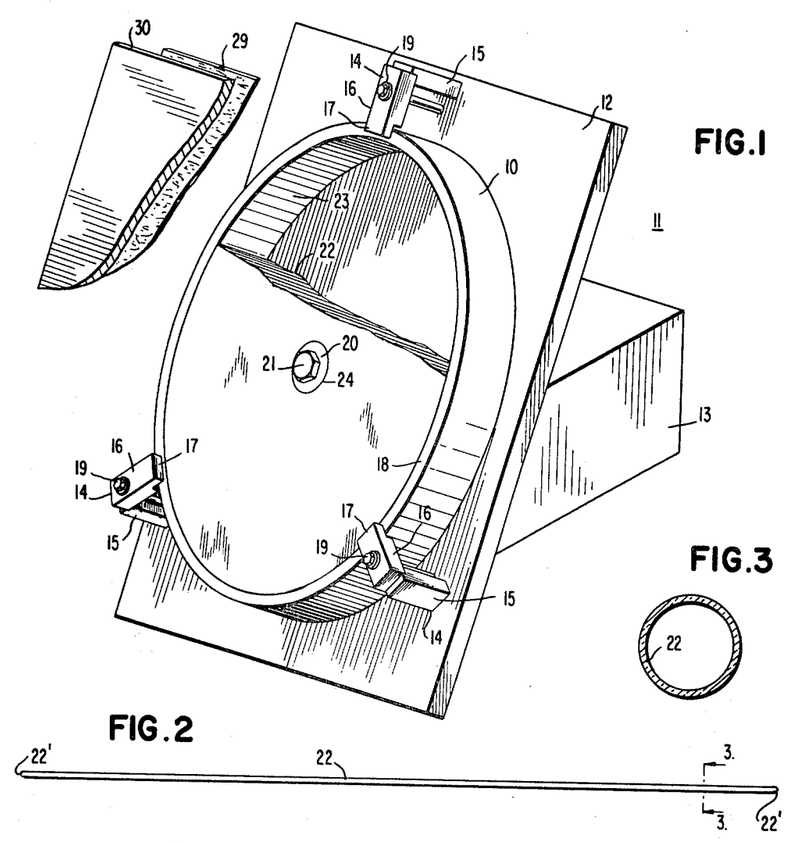
FIG. 1 is a perspective view of a jig assembly utilized in making an embodiment of the structure of the invention and showing a partial packing of tubes within the structure mounted on the assembly.
FIG. 2 is a side view of a glass tube used in making the structure of the invention.
FIG. 3 is an enlarged cross-sectional view of the glass tube taken along lines 3—3 of FIG. 2.

As illustrated in FIG. 1, a ceramic rim 10 is mounted on a jig 11 comprising a face board 12 attached to a conventional vibrator 13. Three clamping means 14 are spaced about the edges of face board 12 and removably secure the rim 10 thereto. Each of clamping means 14 comprises a stem portion 15 fastened to the face board, an arm portion 16 disposed at right angles to the stem portion 15 and provided with a finger portion 17 in contact with the upper edge 18 of rim 10. Arm portions 16 are held in engagement with the rim 10 and the stem portion 15 by fastening means 19 passing through arm portion 16 and secured to the face board 12.

A hub 20 is also removably mounted on the face board 12 and disposed at the center of the rim. Fastener 21 passing through the hub 20 is secured to the face board 12 and maintains the hub in position on the jig. A plurality of hollow, thin-walled, thermally crystallizable glass tubes 22 are then closely packed together with the rim in parallel relationship as illustrated in FIG. 1, i.e., the tubes are parallel to the inner wall 23 of the rim and the outer wall 24 of the hub and, of course, the longitudinal axes of the tubes are essentially parallel.

Each of the glass tubes 22 has both ends 22' sealed, thus trapping air or another thermally expansible fluid medium therein. Tube 22 may have its ends sealed by simply passing the tube end through a flame. Due to the very small size of the tube, the outer diameter of which may, for example, be about 0.030 inches and the wall thickness may be about 0.001 inches, end sealing is readily achieved. However, the method of sealing the tubes is not a part of this invention, and any of the known methods may be used.

Figure 5:
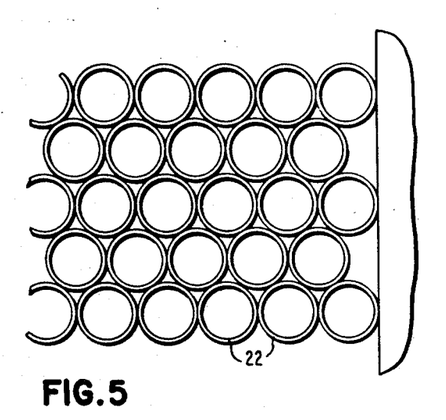
FIG. 5 is a top plan view of a portion of the structure of the invention, greatly enlarged, showing the arrangement of the glass tubes prior to being expanded by heat treatment.

Because it is often desirable and important to have the glass tubes 11 as closely packed as possible so that each tube is in contact with six other tubes, as shown in FIG. 5, the jig 11 is provided with a vibrator 13 which, in turn, causes face board 12 and rim 10 to vibrate (by means not shown). This vibration is imparted to the plurality of glass tubes 22 and assists in more closely packing the tubes as they are placed on top of the tubes which have already been packed. It is to be understood that the rim 21 need not be manually packed, but can be packed by other methods. In either event, the vibration imparted to the glass tubes should be sufficient to ensure the close, tight packing of the tubes within the rim, with each tube in contact with six other tubes.

Figure 4:
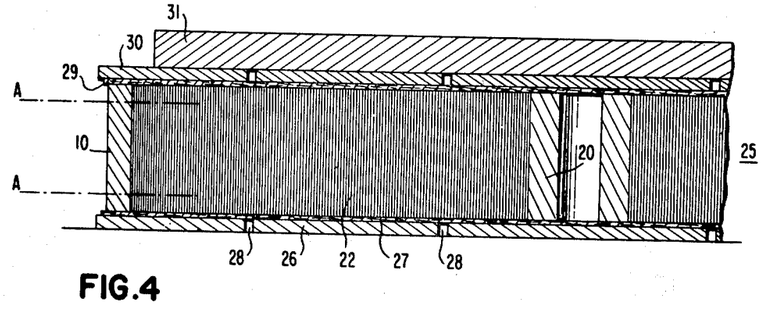
FIG. 4 is a partial cross-sectional view of the structure of the invention of FIG. 1 placed within an assembly prior to heat treatment.

The assembly 25 comprising the rim 10, hub 20, and the closely-packed glass tubes 22 is removed from the jig 11 and placed upon a stainless steel plate 26 having a silica-alumina (Fiberfrax) cloth 27 on its upper surface, as shown in FIG. 4. Plate 26 is provided with a plurality of perforations 28. Another Fiberfrax cloth 29 is placed on the upper surface of the assembly 25, and a second perforated stainless steel plate 30 is placed thereover. A heavy member 31 is finally placed on top of plate 30, and the entire assembly is then placed in a furnace and subjected to heat sufficient to soften the glass walls of tubes 22 and cause the walls to bloat or expand due to the heating of the fluid medium in each tube so that adjoining, contacting wall surfaces are fused together to form a unitary matrix. It is important to have the ends of each of the tubes 22 in assembly 25 sealed during the heating step; otherwise the tube walls will collapse rather than expand when subjected to this heat. Furthermore, to utilize the heating procedure described above with respect to the FIG. 4 assembly, the length of the tubes should be no longer than the height of the rim 23. As the individual tubes expand, the air or other gases in the interstices pass through the perforations in the plates 26 and 30. If desired, plates 26 and 30 need not be perforated, and the assembly can be placed under vacuum during the heating step to assist in the removal of air which is within the interstices between the tubes.

The heating of the thin-walled tubes expands them into close contact with each other and into the interstices between tubes to a greater or lesser extent, ideally to an extent to substantially completely fill the interstices between the tubes and between the tubes and walls of the rim and hub. In the latter event the resulting tubes become essentially hexagonal. The glass tubes are fusing together and are also undergoing nucleation during the heat treatment, and heating of the structure is continued for a time sufficient to in situ crystallize the glass to an at least partially crystalline material, commonly referred to as a glass-ceramic. The rim and hub can be formed of a conventional inorganic crystalline oxide ceramic, made by firing and sintering particulate inorganic oxide materials. The rim and hub should, of course, have an average coefficient of lineal thermal expansion compatible with that of the low expansion material of the matrix. In a preferred embodiment of the invention, the rim and hub are also formed of a thermally crystallizable glass which has been crystallized to a glass-ceramic having physical properties, including thermal expansion and contraction properties, which are close to, and usually the same as, those of the crystalline matrix comprising the fused tubes.

After the assembly 25 has been crystallized, and usually after cooling to room temperature, the outer surface portions of the assembly are removed by sawing with a diamond saw in the direction indicated by lines A in FIG. 4. An assembly of a predetermined thickness is thus obtained, and all of the fused tubes now have open channels since both sealed ends of each tube have been cut away. Alternatively, of course, the ends of the tubes may be left sealed to provide a cellular structure as described hereinbefore, except that the ends are sealed and the cells or passageways are enclosed. The product so produced has exceptional buoyancy for a ceramic product, and can be used as a non-inflammable, chemically inert buoyancy material in life rafts, for instance, and for other applications where buoyancy is desired. Furthermore, the ends of the tubes may be opened only on one end to provide a sound-absorption material which is fireproof and can be used in sound-absorption applications. Furthermore, either material, i.e., the material with one or both ends sealed, is useful as an extremely lightweight heat-insulation material, especially where chemical durability or fire resistance is desired.

In the method of this embodiment of the invention, the ends 25 of tubes 22 are appropriately sealed, e.g., by means of a flame, either before, after, or during the bundling of the tubes. Typically, the tubes are sealed in a gaseous environment, so as to trap the environmental gas within each tube at the surrounding ambient pressure. On heating to effect fusion sealing, the gas within each tube expands so as to prevent collapse of the tubes. With the thin-walled tubes used in this invention, expansion of the entrapped gas causes the tubes to bloat or expand. In a preferred embodiment the expansion is effected until the space between adjacent tubes is essentially filled, and when the tubes are bundled so that each tube is in contact with six adjacent tubes, as shown in FIG. 5, the tubes are reformed into substantially hexagonal shape to provide the matrix structure illustrated in FIG. 6. The tube expansion may be stopped short of full hexagonal development, but the wall-to-wall pressure created by even minimal expansion of the tubes has been found effective to form tube-to-tube seals which are sufficiently tenacious to knit the entire aggregate into an integral, unitary structure of good mechanical properties. Conversely, open tubes without internal pressure acting upon each tube will collapse or deform under the influence of gravity where high temperatures soften the glass enough to cause tube-to-tube bonding.

Tubing used in practicing the usual embodiments of the method of this invention has a maximum inner diameter of up to about 0.1 inch, a wall thickness of 0.001 to 0.015 inch and an inside diameter to wall thickness of at least 6; substantially lower diameter to wall thickness ratios result in a relative ineffectiveness of the process to urge the tubes into a good fusion bond when using a temperature schedule which is also effective to properly nucleate and crystallize the glass tubes to a glass-ceramic during the expanding and fusion heating cycle. In a now preferred embodiment of the invention the ratio of the inner diameter to the wall thickness of the thermally crystallizable glass tubes is at least 7.2; when tubes having such diameter to wall thickness ratio are employed, the unique structure of the invention is made wherein the open frontal or cross-sectional area of the resulting matrix structure is at least 65 percent, and it is usually in fact preferred that the open area be on the order of at least 70 percent and up to 85 percent or more.

Usually, round thermally crystallizable glass tubing is used in forming the matrix structure of the invention. Drawing of round glass tubing to controlled dimensions is an old established art in industry.

While the assembled tubes 22 can merely be fusion sealed with very slight expansion and reformation of the tubes, it is preferred for many applications that the tubes be expanded and reformed into substantially hexagonal shape during fusion sealing. Greater tube-to-tube pressure is generated causing a more perfect fusion of each tube to the surrounding tubes, and tube-to-tube contact area increases from essentially tangential contact with adjacent tubes to essentially full contact, with bonding of the entire periphery of the tubes. Furthermore, as the "triangular" space between each set of three adjacent tubes (see FIG. 5) is substantially eliminated by expansion and reformation, the pressure drop in the finished product across the honeycomb structure is less than across one in which tubing is round in the final product. The thinner the wall thickness for a given composition and the greater the ratio of the inner diameter to such a wall thickness, the more readily the tube can be expanded to a substantially hexagonal tube at a given temperature.

Well suited for use in the method of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass-forming techniques and equipment. After being assembled in the manner shown in FIGS. 1 and 4, the thermally crystallizable glass tubes are subjected to a controlled heat treatment until the tubes have been expanded and fusion sealed and crystallization has been effected.

Thermally crystallizable glass compositions and the glass-ceramics resulting from thermal in situ crystallization thereof which are useful in the method and product of this invention are those which have, in their crystallized state, a coefficient of thermal expansion in the range from $-12$ to $+12 \times 10^{-7}/°C$. over the range 0°–300° C. The compositions usually used are those containing lithia, alumina and silica, together with one or more nucleating agents including $TiO_2$, $ZrO_2$, $SnO_2$ or other known nucleating agents. In general, such compositions containing in weight percent about 55 to 75 $SiO_2$, about 15 to 25 $Al_2O_3$ and about 2 to 6 $Li_2O$, together with about 1.5 to 4 weight percent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatible with the fullest expansion of the tubes in the bloating process. Other ingredients can be present in small amounts, as is understood in the art, such as even as much as four or five weight percent ZnO, up to as much as three or four weight percent CaO, up to as much as eight percent MgO, and up to as much as five percent BaO, so long as the silica plus alumina plus lithia and the nucleating agent(s) are at least about 85, usually 90, weight percent of the total glass and the glass composition will thermally crystallize to a glass-ceramic having the desired low expansion of $-12$ to $+12 \times 10^{-7}/°C$. Exemplary compositions which can be used in the process of the invention include those compositions disclosed in Smith U.S. Pat. No. 3,380,818, those compositions disclosed in U.S. Ser. No. 464,147 filed June 15, 1965, and corresponding British patents Nos. 1,124,001 and 1,124,002, dated Dec. 9, 1968, and also those compositions disclosed in U.S. application Ser. No. 866,168 filed Oct. 13, 1969, and corresponding Netherlands printed patent application 6805259.

In any event, the thermally crystallizable glass tubings in the lithia-alumina-silica field containing nucleating agents as before described, are assembled as previously set forth and the constrained bundles of sealed tubing (containing a heat-expansible fluid) are heated at any suitable rate that will not thermally shock the tubing up to a temperature range in the maximum nucleating range of the glass. The maximum nucleation range can be determined for all such glasses by the general method outlined in Smith U.S. Pat. No. 3,380,818 beginning at column 9, line 54. For the process of the present invention where sealing is to be effected or initiated while nucleation is occurring, it is preferred that the assembled tubes be heated in the range 50° F. to 250° F. above the annealing point for a period of one hour or more. This time can be extended to 10 or 20 hours, and even longer times are not harmful. During this time of heating in such temperature range, nucleation is effected, as well as fusion aided by pressure exerted by expansion of the entrapped fluid. Thereafter, the temperature is raised to a higher temperature than the first heating range, which higher temperature is at least 200° F. above the annealing point temperature or may be as high as the final crystallization temperature (usually 1800° to 2300° F.). The final crystallization can be effected at any such temperature range higher than the nucleation-expansion-fusion temperature (50° to 250° F. above the annealing point temperature) and can be as low as 200° F. above the annealing point or as high as 2300° F. or as high as the upper liquidus temperature. If the final crystallization is effected at temperatures no more than 400° or 500° F. above the annealing point, then the product will not have as high temperature stability as is desired for gas turbine use, but the product will be of the desired low expansion glass-ceramic. In any event, in this second stage of heating further expansion and the beginning of crystallization is effected, followed by the completion of crystallization on continued heating to a degree such that the matrix material has an expansion in the range from $-12$ to $+12 \times 10^{-7}/°C$. over the range 0°–300° C. While the temperature may be raised directly to the final crystallization temperature at a furnace heating rate of at least 50° F. per hour, it is usually preferred to allow crystallization to be effected slowly while further expansion and concomitant fusion are being effected by having an intermediate step between the first nucleation-and-fusion temperature range and the final crystallization temperature, which range is usually from 200° F. to about 500° F. above the annealing point of the original glass. Exemplary holding times in this intermediate range are from 1 to 8 hours, after which the assembly is heated up to the final crystallization temperature, usually in the range of from about 1800° to 2300° F. Obviously, no specific heat treatment instructions can be given suitable for all thermally crystallizable glass compositions. As is well-known, glass-ceramics do not have adequate strength if they are not sufficiently nucleated before crystals are allowed to grow appreciably in size, so that routine experiments known to those skilled in the art are used to determine what length of time is best to obtain an adquate number of crystallization centers or nuclei in the glass in the nucleation temperature range of 50° to 250° F. above the annealing point. Another point that must be kept in mind is that, if it is an object to obtain appreciable expansion beyond that necessary to get good fusion between the tubes, in other words to get appreciable reshaping of the tubes to fill the interstices between tubings, one should not raise the temperature too slowly when going from the nucleation temperature range to the intermediate range, since a rigid crystalline network may begin to set in and to prevent further expansion. We have found some compositions can be heated at a rate as low as 50° F. per hour to this intermediate temperature range and still get sufficient expansion of the tubing effective to form hexagonal tubes (round tubes used in close-packed configuration). On the other hand, some compositions have been found not to fully expand unless the heating rate from the initial nucleation-fusion temperature range to the intermediate temperature range is on the order of at least 200° F. per hour and preferably at least 300° F. per hour.

The length of time of heating in the final crystallization temperature range of 1800° F. to about 2300° F. is from one-half hour to five or six hours, although longer times are in no way deleterious. After the crystallization has been completed, the structure can be cooled at furnace rate or in air because the structure is of such low expansion that thermal shock will not harm it.

When making a regenerator having a rim or having a rim and a hub, the rim, as stated, can be made of a thermally crystallizable glass that is the restraining means in which the tubes are initially packed, and the rim can be heat-treated concomitantly with the tubes, which seal to the rim during the process.

Figure 7:
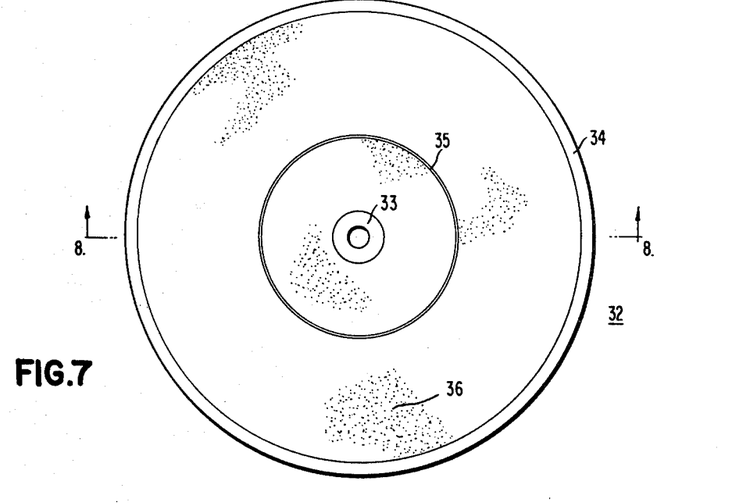
FIG. 7 is a top plan view of another embodiment of a rotary heat exchanger of the invention.
Figure 8:
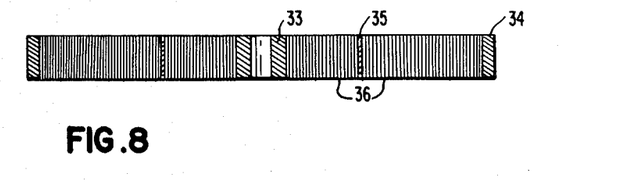
FIG. 8 is a cross-sectional view of the heat exchanger taken along lines 8—8 of FIG. 7.

If, however, a rim of considerable thickness is desired and rapid heating rates such as 200° or 300° F. per hour are used in the heat treatment of the matrix as just described, the glass of the rim may crack from thermal shock. In such case it is possible to preheat treat the rim to a partially crystallized state until it is a relatively low expansion material having an expansion coefficient less than 20 or $25 \times 10^{-7}$/° C. This can be accomplished by using a suitable nucleation and crystallization heat treatment where the top crystallization temperature is on the order of 1450° to 1600° F. and the crystallization is effected only long enough to bring the coefficient of expansion down to the desired range. This partially heat treated rim then can be used as the restraining means without fear of thermal shock. It is also possible to use a fully heat treated glass-ceramic rim or a fully formed and heat treated rim made of a low-expansion sintered ceramic material known in the art, such as ceramic materials that can be made, for instance, from powdered petalite by suitable sintering methods known in the art. What has been said with respect to the rim also applies to regenerators having a hub of ceramic or glass-ceramic material, as illustrated in FIG. 7.

After the heat treatment just described, the product may now be cooled and the sealed ends of the tubes cut or ground away to open each tube to atmospheric pressure. Alternatively, if the intermediate step of heat treating is employed, as is usually the case, the heat treatment can be interrupted after this intermediate step and cooled somewhat or even cooled to room temperature, and the ends of the tubes cut or ground away and opened to atmospheric pressure. Then the assembly can be heated up again into the final crystallization heat treatment range, where further crystallization is effected. Moreover, the expansion and sealing is often far enough advanced after the heat treatment step at 50°-250° F. above the annealing point that the tubes can be cooled and opened after this heat treating step, if desired, and thereafter the assembly reheated and the crystallization heat treatment schedule completed. As will be understood by those skilled in the art, the crystals after the second stage of heat treatment may be in the beta-eucruptite or beta-eucryptite-like state, as is referred to in the referenced Smith U.S. Pat. No. 3,380,818, and already be highly crystallized and of a low expansion. The final heat treatment will cause further crystallization and conversion of the eucruptite-like crystals to beta-spodumene or beta-spodumene-like crystals, as is also described in the cited Smith patent.

While the method of the invention has been described in connection with the usual and important embodiment which starts with tubing having an internal diameter of 0.1 inch or less, the process is also applicable to manufacture of fused matrices of glass-ceramic tubes of larger internal diameter, so long as the ratio of internal diameter to wall thickness is observed as previously disclosed. Of course, with larger tubings the surface density attribute of the matrices obtained is diminished. Thus, starting with larger tubings a matrix otherwise like the preferred matrices of the invention is obtained, but without the high surface density. Thus, starting material tubings can be even as large as 1, 2 or 3 inches, and the process remains essentially the same; also, the novel matrices produced are essentially the same as with the smaller tubings except for the surface density. Thus, they have the same high percentage of open frontal area and the other attributes of the matrices with smaller passageways.

Figure 11:
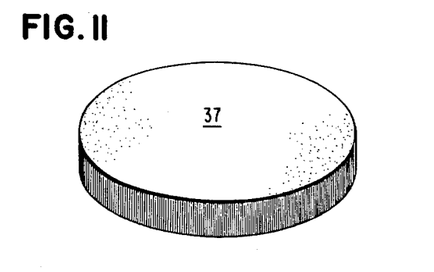
FIG. 11 is a perspective view of still another embodiment of the invention.

As previously mentioned, the tubes can be assembled in any appropriate fashion. Materials for molds in which the tubes are inserted for restraint during the heat treatment process need not be glass-ceramic or ceramic when the object is to make the matrix and not also to concomitantly seal the matrix to the rim or mold. However, the circumferentially supporting mold should be made out of a material which does not crack or deform substantially during the heat treating of the assembly. When the mean effective outside diameter of the tube assembly is about six inches or less, it has been discovered that the support can be constructed out of any metal or metal alloy, such as stainless steel. To prevent chemical reaction or discoloration of the matrix by the metal with the tubes at elevated temperatures, e.g., at temperature of nucleation, crystallization, expansion, and/or fusion, a layer of silica-alumina (Fiberfrax 970J) paper may be interposed between the metal case and the assembly of glass tubing. For assembly of diameters greater than six inches, the mold should be constructed of a material having substantially the same coefficient of thermal expansion as the matrix in its heat treated state. Glass-ceramic molds work well. Of course, these glass-ceramic molds can also be used with smaller assemblies. Using a mold wherein the glass tubes are not in contact with the walls of the mold results in the matrix 37 shown in FIG. 11 which consists essentially of the fused ceramic tubes, without a rim bonded thereto. The matrix is suitable for use as a gas turbine regenerator. If desired, a central opening can be ground therethrough to form a bearing or the matrix can be formed about a hub, as illustrated in FIGS. 1 and 12 where the tubes are bonded to the outer walls of the hub.

Figure 12:
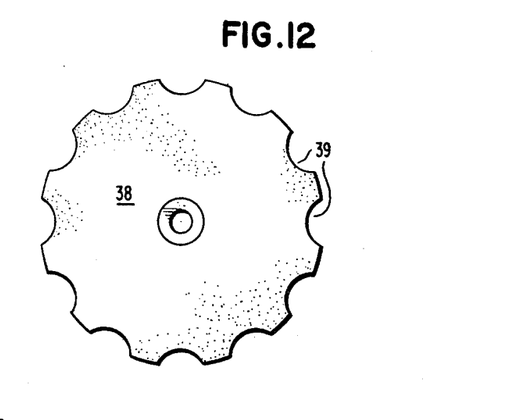
FIG. 12 is a top plan view of a modification of the embodiment of FIG. 11 wherein recesses are provided at the outer periphery thereof, which recesses are adapted to receive and engage driving means for the structure.

The glass-ceramic matrix 38 illustrated in FIG. 12 has a plurality of recesses 39 formed in its outer periphery, which recesses are adapted to receive and engage driving means mounted on a gas turbine engine (not shown) to impart a rotary movement to the regenerator or matrix 38. The recesses 39 can be formed by cutting the periphery of a matrix such as that shown in FIG. 11, or the matrix of FIG. 12 can be formed in a special mold.

Figure 10:
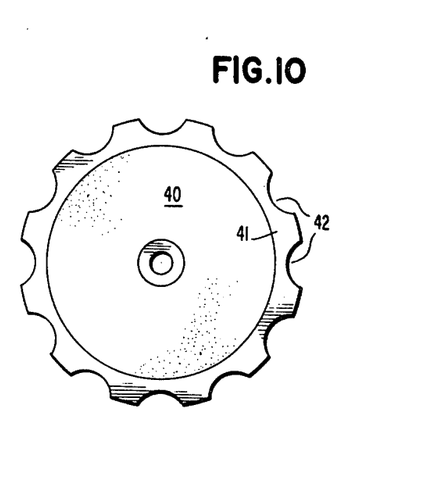
FIG. 10 is a top plan view of an embodiment similar to that of FIG. 4 wherein the rim is provided with a series of recesses adapted to receive and engage driving means for the structure.

With unlined thermally crystallizable glass or glass-ceramic molds, the fused bundle of tubes will be bonded to the mold during the heating cycle to provide a unitary article including a solid rim. Thus, cellular assembly 25 comprises tubes 22, rim 10, and hub 20, all having substantially the same lineal coefficient of thermal expansion and contraction. In addition to providing lateral support for the expanded and fused tubes 22, rim 10 is highly useful when the cellular structure or assembly 25 is used as a gas turbine regenerator. Many gas turbine engines are designed for rim drive regenerators. By casting or machining drive means or receivers, e.g., gear teeth, cups, etc., into rim 10, cellular structure 25 is adapted for use as a rim-driven regenerator wheel in turbine engines. FIG. 10 illustrates a regenerator wheel 40 wherein the outer periphery of the rim 41 is provided with recesses 42.

In a further embodiment of this invention, the tubes are bundled about the circumference or perimeter of a bushing or bearing or core 20 of a material having substantially the same coefficient of thermal expansion as the tubes. Such core 20 can be solid or hollow and typically is positioned at the center of the assembly.

Figure 9:
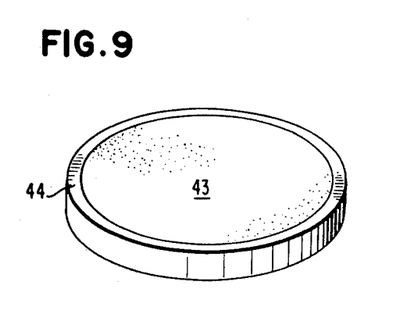
FIG. 9 is a perspective view of another embodiment of the heat exchanger of the invention.

A matrix assembly 43 bonded to a rim 44 and having no core or hub is illustrated in FIG. 9. When the center of the matrix is cored and a bearing inserted therein, the assembly can be mounted for rotation in a gas turbine engine.

Although FIGS. 1 and 4 illustrate articles with only one rim 10, a series of one or more concentric rims containing the matrix can be used. Thus, as illustrated in FIG. 7, cellular article or assembly 32 can comprise hub 33, outer ring or rim 34 and inner ring or rim 35 with cellular matrix 36 comprising a plurality of the elongated glass-ceramic tubes which are expanded and fused together into a unitary structure therebetween. The cellular matrix between the hub and the rings has the characteristics previously discussed. Use of these concentric rings enhances the strength of the overall article and serves to protect the matrix surface against abrasion as it rotates relative to a seal bar.

Figure 13:
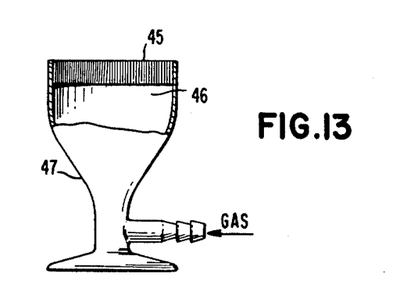
FIG. 13 is a side elevation in cross-section of a gas burner utilizing the structure of the invention.

While the foregoing has emphasized the utility of the structure of this invention as a gas turbine regenerator, it is well suited for use in other fields. Thus, the cellular article of the invention can be used as a nozzle for a gas-fired burner, as a grating for an infrared heater, as a filter, as a catalyst support, etc. FIG. 13 shows the matrix 45 of the invention disposed within the nozzle 46 of a gas burner 47, such as a Bunsen burner which burns a mixture of gas and air.

Figure 14:
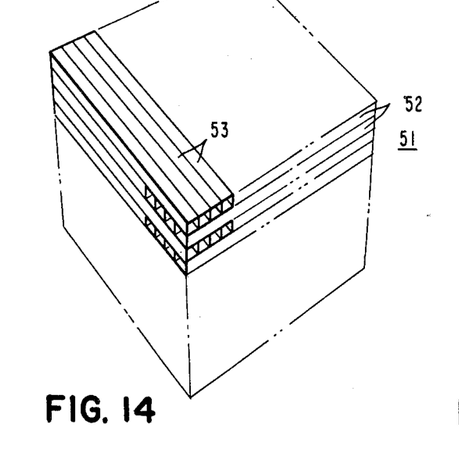
FIG. 14 is a perspective schematic view of another embodiment of the matrix of the invention showing an enlarged arrangement of tubes in alternate layers with the tubes in each layer parallel to each other and transverse to tubes in adjacent layers.
Figure 15:
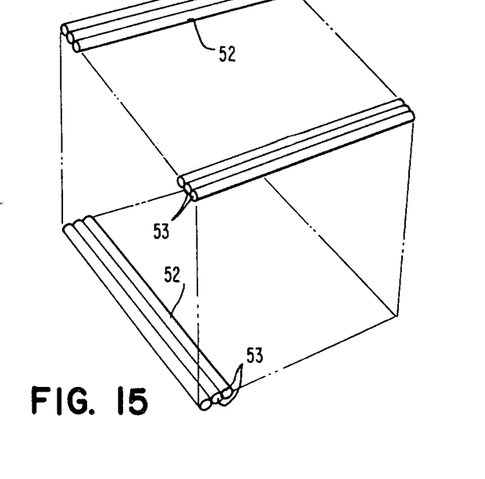
FIG. 15 is a perspective schematic view of the matrix embodiment illustrated in FIG. 14 and showing the arrangement of tubes before they have been expanded and fused together.

The unique method of the invention is also applicable to making a unitary foraminous glass-ceramic matrix structure 51 in arrangements other than heretofore described, such as a matrix wherein a plurality of layers 52 of tubes 53 are superimposed one above the other in successive parallel planes, the tubes within each plane being essentially parallel to each other and transverse to tubes in adjacent layers, each tube being integrally fused to each adjacent parallel tube and each adjacent transverse tube. Such a structure is illustrated in FIG. 14. When, as preferred, the tubes are essentially fully expanded, each tube wall is a common wall with each tube adjacent thereto, including those in the same plane and those in adjacent parallel planes; moreover, when fully expanded, the passageways formed are essentially in the shape of a parallelogram, usually a square or a rectangle. FIG. 15 illustrates the tubing layers before assembly, using round tubes, while FIG. 14 shows the matrix with the tubes expanded to essentially square passageways. In FIG. 15 the tubes are not shown as closed, but as they would appear in cross-section. However, they are of course sealed as before described.

After the heat treatment as before described, the integral product containing the rectangular or square passageways is obtained. As in the other embodiment of the invention, the material, left sealed, is a lightweight and fire-resistant sound- or heat-insulation material and is of course a buoyant material. With the ends of the tubes ground off to open them, the material is suitable as a low expansion, heat- and thermal shock-resistant heat exchanger or recuperator. Thus, for instance, hot gas from a gas turbine can be passed through the matrix in one direction, while cold incoming air can be passed through in the transverse direction, picking up heat from the hot gas turbine combustion gases.

When starting with round tubes having a ratio of the inner diameter to wall thickness of at least 6, the open or free cross-sectional or frontal area of each face of the matrix containing passageways is at least 32 percent. When starting with round tubes having an inner diameter to wall thickness ratio of 7.2, the open cross-sectional or frontal area of each face containing openings is at least 36 percent.

For many applications, particularly when the matrix is used as a heat exchanger or recuperator, it is preferred that the passageways be essentially fully expanded into the shape of a parallelogram, such as a square or a rectangular passageway. Obviously, such expansion essentially eliminates the interstices between tubes and thus increases the effective heat transfer surface from one layer of tubes or passageways to the adjacent transverse layer of passageways.

To facilitate the assembling of the tubes 53 into layers 52 so that the layers may be superimposed one upon another, with the tubes in one layer being transverse to the tubes in the adjacent layers, a plurality of tubes 52 of definite length are placed side by side in contact with adjacent tubes to form a ribbon of predetermined length. While maintaining the tubes in this parallel contacting relationship, the upper surface of the layer of tubes is spray-coated with an air-setting bonding composition so that the ribbon of tubes becomes rigid enough to handle like a thin sheet of plastic material. A flame is applied to each side of the ribbon and held in contact with the ends of the tubes until the ends fuse together, trapping air within the tubes. The ribbon of tubes is then cut into rectangular sheets and the sheets arranged in the manner illustrated in FIG. 15.

The air-setting bonding composition which can be used is a polyurethane, Goverlac A6210, made by Spraylar Corporation, 1 Park Avenue, New York, although other compositions will be readily understood by the art as accomplishing the same purpose. For instance, a 2.5 to 3 weight percent solution of nitrocellulose in amyl acetate can also be used. The composition used must have the property of setting quickly so as to adhere the tubes to each other in the form of a ribbon and yet volatilize rapidly when exposed to the heat necessary to soften the tube walls and expand them in the manner described above and to fuse the contacting wall surfaces together to form a monolithic structure. Preferably, the bonding composition should leave no residue.

Figure 18:
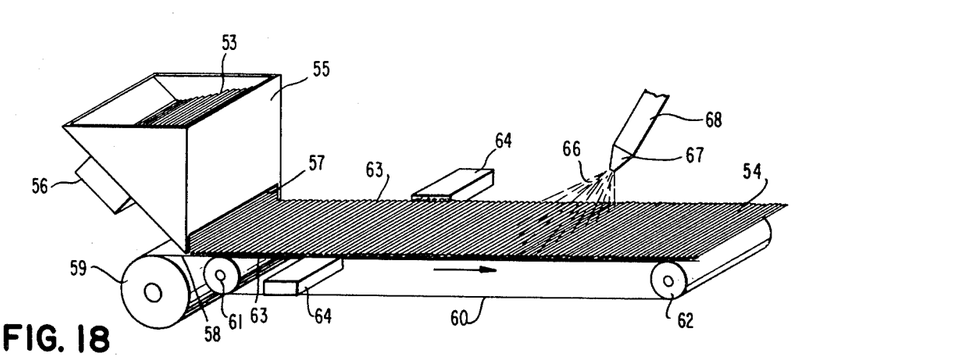
FIG. 18 is a plan view of apparatus utilized in making the ribbon of parallel tubing.

FIG. 18 illustrates one embodiment of an apparatus useful in making a continuous ribbon 54 of parallel tubes, which ribbon can be cut to desired lengths and utilized in making the recuperator of the invention. A plurality of tubes 53 previously cut to a specified length are fed into hopper 55 by means not shown. Hopper 55 is continuously vibrated by means of vibrator 56 in contact therewith, so that the tubes 53 are maintained in parallel relationship and are deposited individually through opening 57 at the base of the hopper onto support layer 58 disposed directly below opening 57 and continuously moving in a direction away from the hopper 55. Support layer 58, which can be a plastic film, paper such as the thin paper used in making tea bags, cellophane, or other film material, is continuously unwound from roll 59 which is rotatably mounted beneath hopper 55. Support layer 58 passes over and is supported by conveyor belt 60 continuously moving around support rollers 61,62, with either or both rollers being drive by means not shown but well understood in the art.

Figure 19:
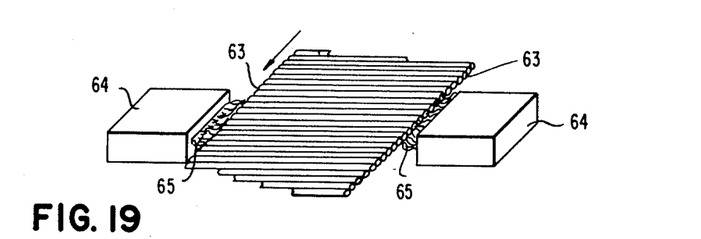
FIG. 19 is an enlarged perspective view of a portion of the apparatus of FIG. 18 showing the pair of burners fusing and sealing the ends of the tubes.

As the individual tubes 53 pass through the bottom of the hopper 55 from opening 57, they are deposited on support layer 58 and move in the direction away from the hopper. The rate of movement of support layer 58 and the rate of deposit of the tubes 53 thereon are adjusted so that the tubes are deposited and maintained in parallel, contacting relationship with adjacent tubes. As the support layer and tubes move away from hopper 55, the ends 63 of each tube pass through oppositely deposited burners 64 mounted on either side of conveyer belt 60, and the burner flames 65 fuse and close the tubes, trapping the air within the tubes. The flames 65 can be directed so that they do not adversely affect the support layer 58 but only impinge on the tube ends 63.

As ribbon 54 of parallel tubes continues along the conveyer after the tubes have their ends closed, a thin layer of air-setting bonding material 66 is sprayed onto the upper surface of the ribbon 54 by means of nozzle 67 of spray gun 68, which material bonds the tubes together so that the ribbon of tubes becomes rigid enough to be handled like a thin sheet of plastic material. Alternatively, the layer of tubes can be sprayed with the bonding material prior to having their ends sealed by flames 65. The support layer 58 is readily separated from the ribbon 54. The ribbon is then cut into rectangular sheets and arranged in the manner illustrated in FIG. 15 so that alternate sheets or ribbons of tubing are transverse to adjacent sheets or ribbons of tubing. Preferably, the tubes in alternate sheets or layers are at 90° angles.

In another arrangement, support layer 58 can be of a relatively thin material, such as tea bag paper, to which is applied a binder or adhesive prior to the tubes 53 being deposited thereon. The tubes thus adhere to the support layer and the ribbon of tubes thus formed can be cut to the desired size and assembled to form a rectangular matrix, such as illustrated in FIG. 15. Again, the paper and binder are of a composition which permits rapid volatilization upon the application of heat for the bloating and fusing of the tubes, without any deleterious residue remaining. Such paper and binders are known in the art.

A plurality of rectangular matrices 51, each consisting essentially of tubes of thermally crystallizable glass fused together in a monolithic structure, are arranged in a mold in such a manner that each matrix is adjacent to and separated from each adjoining matrix by a wedge-shaped member 69 of crystallizable glass and preferably of the same composition as that from which the tubes 53 in matrices 51 have been formed. The wedge-shaped member 69 has each of its outer surfaces 70 tapering inwardly within the structure to substantially a point 71. In the recuperator 72 illustrated in FIG. 16, the inner surfaces 73 of each rectangular matrix 51 is separated by the extremely narrow edge 74 of the wedge member 69. It is preferable that edge 74 be as narrow as possible so that the inner surface of the recuperator is essentially defined by the inner surfaces 73 of the matrices, thus providing a maximum of passageways for gases to pass to the exterior.

Figure 16:
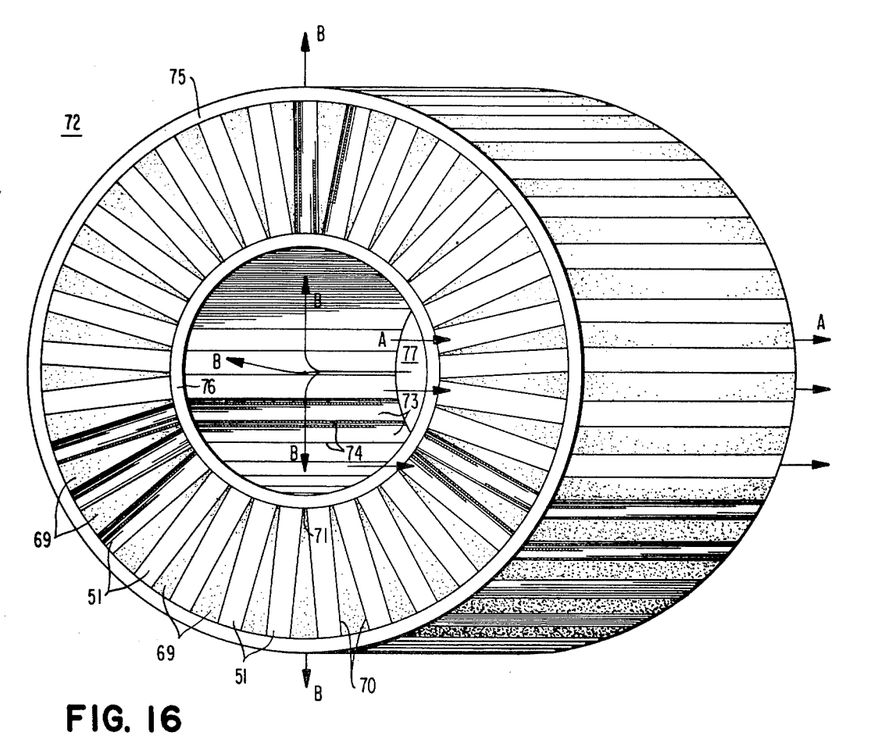
FIG. 16 is an isometric view of a regenerator formed with a plurality of matrix segments having the arrangement illustrated in FIG. 14.
Figure 17:
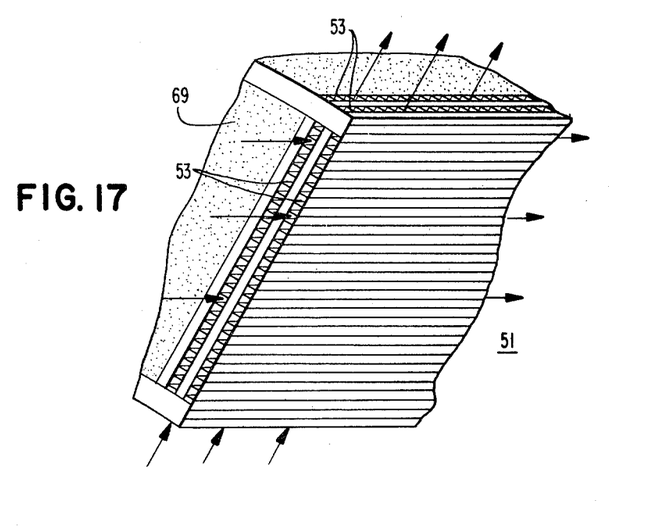
FIG. 17 is an expanded view of a portion of the regenerator illustrated in FIG. 16.

Due to the alternating arrangement of rectangular matrices and wedge-shaped members, an annular structure as shown in FIG. 16 is formed within the mold. The assembly is then placed in an appropriate furnace and heated to the nucleating temperature of the particular thermally crystallizable glass composition utilized in the structure. After nucleation is completed the nucleated structure is subjected to the temperature necessary to at least partially crystallize the glass and form a unitary structure or recuperator wherein the contacting surfaces of the rectangular matrices and wedge-shaped members are firmly bonded or fused to each other. The heat treatment steps for the nucleation and crystallization of the recuperator members are those described above with respect to the regenerator of the present invention.

An alternate method for making the recuperator would be to thermally crystallize the individual matrices 51 and wedge-shaped members 69 and then seal the members together to form the structure of FIG. 16. A thermally crystallizable sealing glass having a coefficient of thermal expansion which is substantially that of the members being sealed is applied to all contacting surfaces prior to assembling the members. The assembled structure is then subjected to the heat necessary to crystallize the sealing glass and bond the members together.

Because of the arrangement of the tubes 53 in the rectangular matrices in the recuperator 72, a cross flow of gases through the recuperator is achieved. Cool exterior gases, as from a compressor, can pass through the open passageways of tubes 53 which are in a direction (indicated by arrows A in FIG. 16) parallel to the axis of the recuperator, while the hot exhaust gases of a gas turbine engine can flow inwardly (indicated by arrows B) into the center 77 of the recuperator and out through those passageways which are transverse to the axis of the recuperator. Thus, the cool gases such as air, passing through the recuperator passageways are heated by the walls of such passageways which are, in turn, heated by the gases passing through the passageways which are transverse to the former and separated only by the common wall thickness.

Seal seating surfaces 75,76 are provided on each side of the recuperator. The recuperator of FIG. 16 does not have to be rotated nor does it have to come in contact with a seal bar, thus eliminating the wear which normally occurs on the surfaces of the recuperator formed by the ends of the tubes.

The recuperator of the invention has many advantages over the metal or ceramic recuperators of the prior art. Metal recuperators have usually been made of nickel alloy which is expensive and difficult to shape and braze. Such recuperators often leak after repeated cyclings. Recuperators have also been made of corrugated sheets of ceramic which are stacked together to form a cross-flow pattern and then sintered. However, it is difficult to make the joints of these prior art recuperators and failure of recuperators usually occurs in these areas. Further, heat-resistant metals are expensive and often fail in thermal fatigue while sintered ceramic recuperators are porous. Applicant's recuperator, on the other hand, is nonporous, has a low expansion coefficient and preferably has a zero-expansion, and is not subject to thermal fatigue or to weaknesses at the joints.

The following examples will serve to illustrate the invention without in any way limiting it, since modifications will be readily apparent to those having ordinary skill in the art. All of the matrices made in such examples had the properties set forth herein including the preferred 65 percent or higher open frontal area.

EXAMPLE I

The following batch materials, expressed in parts by weight, were melted at a glass temperature of 2900° F. for about 72 hours in a high alumina refractory (Monofrax M) tank furnace using a slight excess of air for an oxidizing atmosphere:

| Ingredients | Parts by Weight |
|---|---|
| Ottawa Ground Silica | 242.0 |
| Alumina (Alcoa A-10)[1] | 82.5 |
| Lithium Fluoride | 1.8 |
| Sodium Antimonate | 4.3 |
| Petalite[2] | 252.2 |
| Lithium Carbonate | 26.1 |
| Lithium Chloride | 6.2 |
| Lithium Nitrate | 3.5 |
| $TiO_2$ | 10.9 |
| Zinc Oxide | 10.5 |
| Zinc Zirconium Silicate[3] | 18.2 |

[1] 99.4% $Al_2O_3$, 0.04% $Fe_2O_3$, 0.13% $SiO_2$, 0.13% $Na_2O$, 0.3% ignition loss.
[2] $SiO_2$ 77.28; $Al_2O_3$ 16.43; $Li_2O$ 3.90; $Na_2O$ 0.73; $K_2O$ 0.42; $Fe_2O_3$ 0.033; ignition loss 0.90.
[3] $SiO_2$ 25.4; ZnO 29.4; $ZrO_2$ 45.3.

The analyzed composition of the glass, in weight percent, was as follows:

| | |
|---|---|
| $SiO_2$ | 70.6 |
| $Al_2O_3$ | 19.7 |
| $TiO_2$ | 1.7 |
| $ZrO_2$ | 1.5 |
| ZnO | 1.7 |
| $Sb_2O_3$ | 0.5 |
| $Li_2O$ | 3.7 |
| $Na_2O$ | 0.4 |
| $K_2O$ | 0.2 |
| $Cl_2$ | 0.1 |
| $F_2$ | 0.1 |

Circular tubing having an average wall thickness of 0.001 inch and an average inside diameter of 0.016 inch was drawn from this thermally crystallizable glass. The inside diameter to wall ratio was 16.0. The tubing was simultaneously cut and sealed to 3.75 inch lengths with a gas oxygen flame in ambient air. The annealing point of this glass was about 1260° F.

The sealed tubing was tightly packed parallel to the length of a 3.75 inch thick stainless steel mold having an inside diameter of 4.25 inches. The mold had previously been lined with a layer of 0.125 inch thick alumina-silica paper (970-J Fiberfrax). The ends of the mold were then lined with this same alumina-silica paper and the assemblage heated in an electric kiln on the following schedule:

| Temperature | Time or Rate |
|---|---|
| Ambient to 800° F. | 396° F./hr. |
| Hold at 800° F. | 1 hr. |
| 800° F. to 1350° F. | 366° F./hr. |
| Hold at 1350° F. | 2¼ hrs. |
| 1350° F. to 1750° F. | 342° F./hr. |

-continued

| Temperature | Time or Rate |
|---|---|
| Hold at 1750° F. | 5 hrs. |
| 1750° F. to 100° F. | 51° F./hr. |

After this heat treatment, the resulting glass-ceramic matrix was removed from the cylinder, the ends opened by grinding, and the product heated at a rate of 50° F./hr. to a temperature of 2000° F. and held at that temperature for one hour. Then the matrix was cooled to room temperature at a rate of about 51° F./hr. The higher temperature heat treatment serves mainly to increase the stability of the glass-ceramic at operating temperatures as discussed hereinbefore.

The foregoing heat treatment thermally in situ crystallized the glass and produced a glass-ceramic matrix. The heat treatment had fusion bonded the walls of each tube to those of adjacent tubes and reformed each tube to substantially hexagonal shape. The open frontal area of the matrix was measured to be over 76%, and the coefficient of lineal thermal expansion was about $0.2 \times 10^{-7}/°C$. (0°–300° C.). Measurement of frontal open area was effected by measuring the weight of a specific volume and comparing it to the density of the solid glass-ceramic.

EXAMPLE II

A heat regenerator similar to that illustrated in FIG. 4 was made in accordance with the following procedure:

A rim having a 28 inch diameter and a hub having a 3 inch diameter were cast slightly oversize in metal molds using the thermally crystallizable glass compositions as described in Example I. The rim and hub were then diamond ground to the 28 inch and 3 inch diameters, respectively, and also ground to a 3.75 inch height.

Both rim and hub were prefired in accordance with the following heat schedule after being heated to a temperature of 1200° F.:

| Temperature | Time or Rate |
|---|---|
| 1200° F. Hold | 1 hr. |
| To 1300° F. | 100° F./hr. |
| 1300° F. Hold | 2¼ hrs. |
| 1300° F. to 1420° F. | 10° F./hr. |
| 1420° F. Hold | 4 hrs. |
| 1420° F. to 1550° F. | 25° F./hr. |
| 1550° F. Hold | 2 hrs. |
| Cool to Ambient Temp. | 200° F./hr. |

The rim and hub were then mounted on a jig and sealed glass tubing having a length of 3.75 inches, an outer diameter of 0.028 inch, and an average wall thickness of 0.0025 inch was packed tightly between the hub and rim. The tubing was of the same glass composition as in Example I. The packed assembly was placed horizontally onto an alumina-silica cloth (Fiberfrax) spread over a perforated stainless steel plate. A second alumina-silica cloth was placed over the assembly, and a second perforated stainless steel plate placed thereon, in the manner shown in FIG. 4. A weight was placed onto the second steel plate, and the entire assembly was placed into a gas-fired kiln and heated in accordance with the following schedule:

| Temperature | Time or Rate |
|---|---|
| To 800° F. | 132° F./hr. |
| 800° F. Hold | 45 min. |
| 800° F. to 1375° F. | 366° F./hr. |
| 1375° F. Hold | 165 min. |
| 1375° F. to 1850° F. | 282° F./hr. |
| 1850° F. Hold | 480 min. |
| 1850° F. to 2000° F. | 50° F./hr. |
| 2000° F. Hold | 75 min. |
| 2000° F. to 300° F. | 54° F./hr. |

During this heat treatment, the thermally crystallizable glass tubes were thermally in situ crystallized to a glass ceramic. They had also reformed into generally hexagonal shapes while becoming firmly fusion-sealed to each other as well as to the rim and the hub. The open frontal area was about 70 percent.

The outer surfaces of both sides of the assembly were then ground, opening the tubes at either end and establishing the final thickness of the assembly. The outer diameter of the rim was ground to a predetermined size, and drive slates were ground into the solid rim about its circumference. A center bearing hole was bored through the hub and the walls of the hole were ground to a predetermined size.

The coefficient of lineal thermal expansion of the assembly was measured, and the results were as follows:

|  | (0–300° C.) | (0–700° C.) |
|---|---|---|
| Hub | $0.9 \times 10^{-7}$ | $4.6 \times 10^{-7}$ |
| Matrix | $0.1 \times 10^{-7}$ | $4.2 \times 10^{-7}$ |
| Rim | $0.2 \times 10^{-7}$ | $4.7 \times 10^{-7}$ |

EXAMPLE III

Using the thermally crystallizable glass composition of Example I, circular tubing having a wall thickness of 0.003 inch and an average inside diameter of 0.028 inch was drawn and sealed in 3.75 inch lengths as in Example I. After packing the sealed tubing in a stainless steel mold, as in Example I, the assembly was heated in an electric kiln according to the following schedule:

| Temperature | Time or Rate |
|---|---|
| Ambient to 800° F. | 396° F./hr. |
| Hold 800° F. | 1 hr. |
| 800° F. to 1350° F. | 366+ F./hr. |
| Hold 1350° F. | 2¾ hrs. |
| 1350° F. to 1750° F. | 300° F./hr. |
| Hold 1750° F. | 10 hrs. |
| 1750° F. to 2000° F. | 50° F./hr. |
| Hold 2000° F. | 10 mins. |
| 2000° F. to 100° F. | 100° F./hr. |

After removal from the stainless steel cylinder, the ends of the resulting matrix were ground open with a diamond abrasive wheel. None of the individual tubes had collapsed during the heating cycle, and the tubes making up the matrix, still substantially circular in cross-section, were well bonded to each other.

During the heat treatment, the glass had converted to a glass-ceramic by thermal in situ crystallization. By testing samples of the same composition which had been subjected to the same heat treatment, it was found that the walls of the tubes had a coefficient of lineal thermal expansion of $0.2 \times 10^{-7}/°C$. over the range 0° to 300° C., and an average thermal conductivity of 0.0035 cal/cm/sec/°C./cm², measured using a hot side of 648° C. and a cold side of 88° C. The matrix had an open frontal area of about 71 percent.

EXAMPLE IV

Glass tubing was drawn to an average outside diameter of 0.050 inch, inside diameter of 0.046 inch, and a 0.002 inch wall thickness by the following procedure:

The glass was melted and held at 2900° F. in a gas fired furnace for 24 hours. The temperature was then lowered to 2475° F., and drawing of the tubing, averaging ⅜ inch outside diameter, was begun. This tubing was subsequently reheated to 1600° F. at one end and drawn down to the aforementioned size.

The tubing glass had the following composition:

| Component | Weight Percent |
|---|---|
| $SiO_2$ | 68.6 |
| $Al_2O_3$ | 21.3 |
| $TiO_2$ | 2.0 |
| $ZrO_2$ | 1.6 |
| $Sb_2O_3$ | 0.3 |
| $CaO$ | 3.5 |
| $MgO$ | 0.1 |
| $Li_2O$ | 4.0 |
| $Na_2O$ | 0.4 |
| $K_2O$ | 0.2 |

Its annealing point temperature was about 1250° F.

The tubing was cut and sealed at both ends by a flame into four-inch lengths, and the tubing was then closely packed into a larger tube of the same composition having a ⅞ inch inside diameter and a 1 inch outside diameter and having a length of 4 inches.

The assembly was heated from room temperature to 1925° F. at a rate of 350° F./hr, held at that temperature for one hour, and then cooled to room temperature at the rate of 350° F./hr. The ends of the assembly were then cut off. Because of the internal air pressure developed in the tubes during firing, the tubes had expanded and bonded to each other and to the walls of the larger tubing that served to restrain the expanding bundles of sealed tubes.

To fully crystallize the assembly, it was heat treated according to the following schedule:

| Temperature | Time or Rate |
|---|---|
| Room Temperature to 1375° F. | 350° F./hr. |
| 1375° F. Hold | 16 hrs. |
| 1375° F. to 1600° F. | 350° F./hr. |
| 1600° F. Hold | 1 hr. |
| 1600° F. to 2150° F. | 350° F./hr. |
| 2150° F. Hold | 1 hr. |
| 2150° F. to Room Temperature | 350° F./hr. |

The thermally crystallized matrix assembly was cut into sections of ⅜ inch thickness with a diamond saw and used as burner grids. A gas-air mixture was fed through a burner terminating with one of the honeycomb sections. The burning fuel mixture quickly heated the glass ceramic grid to incandescence, and the incandescent surface then served as a catalytic surface to promote the gas-air reaction. The result was a steady, efficient radiant flame.

Specimens of the same glass-ceramic were measured for various physical properties. The intrinsic density of the material was found to be 2.5 g/cc; the bulk density of the expanded matrix was 0.39 g/cc; and the coefficient of lineal thermal expansion was $8 \times 10^{-7}/°C$. (0°–300° C.). The open frontal area was measured to be about 85 percent.

As used herein in the claims appended hereto, the term "glass-ceramic" is an inorganic crystalline oxide ceramic material containing a multiplicity of extremely small inorganic oxide crystals in random orientation throughout the mass of the material, which glass-ceramic is formed by the thermal in situ bulk crystallization of a glass.

While there have been shown and described and pointed out the fundamental novel features of the invention with a reference to preferred embodiments thereof, those skilled in the art will recognize that various changes, substitutions, omissions, and modifications in the structure illustrated may be made by those skilled in the art without departing from the spirit of the invention.

What is claimed is:

1. An annular recuperator comprising a plurality of matrices, each of said matrices comprising an assembly of integrally fused tubes arranged in a plurality of layers of tubes superimposed one above the other in successive parallel planes, the tubes within each plane being essentially parallel to each other and transverse to the tubes in adjacent layers, the tubes in each layer forming a series of longitudinal parallel passageways through the matrix wherein the walls of said passageways
(1) have essentially zero porosity,
(2) consist essentially of an inorganic crystalline oxide ceramic material,
(3) have an average coefficient of lineal thermal expansion of about $-12$ to $+12 \times 10^{-7}/°C.$, over the range 0°–300° C., and
wherein the inner diameter of said passageways is at least 3 times the wall thickness through portions of said walls common to adjacent fused tubes, and wherein the open frontal or cross-sectional area of each face of the matrix containing passageways is at least 32 percent of the cross-sectional area across such face, each of said matrices having a wedge-shaped spacer member bonded to each of a pair of oppositely disposed surfaces of said matrix, said matrices and members forming a structure having an annular configuration and an annular central opening, the arrangement of said matrices providing two flow paths for fluid media passing through said recuperator, one of said flow paths being parallel to the axis of the annular recuperator, the other of said flow paths being transverse to the axis of the annular recuperator and communicating with said central opening.

2. The recuperator defined in claim 1 wherein said spacer members are formed of an inorganic crystalline oxide ceramic having substantially the same coefficient of thermal expansion as the walls of said matrix passageways, each of said spacer members being fused to adjacent matrices.

3. An annular recuperator comprising a plurality of matrices, each of said matrices comprising an essembly of integrally fused tubes arranged in a plurality of layers of tubes superimposed one above the other in successive parallel planes, the tubes within each plane being essentially parallel to each other and transverse to the tubes in adjacent layers, the tubes in each layer forming a series of longitudinal parallel passageways through the matrix, wherein the walls of said passageways
(1) have essentially zero porosity,
(2) consist essentially of an inorganic crystalline oxide ceramic material,
(3) have an average coefficient of lineal thermal expansion of about $-12$ to $+12 \times 10^{-7}/°C.$, over the range 0°–300° C., and each passageway has a maximum inner diameter of about 0.1", and
(4) have a wall thickness of about 0.03 to about 0.002 inch through portions of such walls common to adjacent fused tubes, the ratio of the inner diameter of said passageways to said wall thickness being at least 3, and
wherein the open frontal or cross-sectional area of each face of the matrix containing pasageways is at least 32 percent of the cross-sectional area across such face, each of said rectangular matrices having a wedge-shaped spacer member bonded to each of a pair of oppositely disposed surfaces of said matrix, said matrices and members forming a structure having an annular configuration and an annular central opening, the arrangement of said matrices providing two flow paths for fluid media passing through said recuperator, one of said flow paths being parallel to the axis of the annular recuperator, the other of said flow paths being transverse to the axis of the annular recuperator and communicating with said central opening.

4. The annular recuperator as defined in claim 3 wherein each of said matrices is substantially rectangular in configuration.

5. The annular recuperator as defined in claim 3 wherein the ratio of the inner diameter of said passageways to the wall thickness of said passageways is at least 7.2 and the open frontal or cross-sectional area of each face of the matrix is at least 36 percent of the cross-sectional area of such face.

* * * * *